United States Patent
Koralski

(10) Patent No.: US 9,164,978 B2
(45) Date of Patent: Oct. 20, 2015

(54) IDENTIFYING OBJECTS WITHIN A MULTIDIMENSIONAL ARRAY

(75) Inventor: Atanas Georgiev Koralski, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 981 days.

(21) Appl. No.: 12/140,273

(22) Filed: Jun. 17, 2008

(65) Prior Publication Data
US 2009/0313287 A1    Dec. 17, 2009

(51) Int. Cl.
*G06F 17/30* (2006.01)
*G06F 17/00* (2006.01)
*G06F 17/24* (2006.01)

(52) U.S. Cl.
CPC .................... *G06F 17/246* (2013.01)

(58) Field of Classification Search
CPC .................................................. G06F 17/246
USPC ......................................... 707/741, 769, 801
See application file for complete search history.

(56) References Cited

U.S. PATENT DOCUMENTS

| | | | | |
|---|---|---|---|---|
| 5,021,995 A * | 6/1991 | Quint et al. | ............................ | 1/1 |
| 5,359,724 A | 10/1994 | Earle | | |
| 5,926,820 A * | 7/1999 | Agrawal et al. | ........................ | 1/1 |
| 6,085,202 A | 7/2000 | Rao et al. | | |
| 6,292,810 B1 * | 9/2001 | Richards | ........................ | 715/201 |
| 6,401,098 B1 | 6/2002 | Moulin | | |
| 6,438,549 B1 | 8/2002 | Aldred et al. | | |
| 6,470,347 B1 * | 10/2002 | Gillam | .................................. | 1/1 |
| 6,985,895 B2 * | 1/2006 | Witkowski et al. | ............ | 707/696 |
| 7,237,188 B1 * | 6/2007 | Leung | ............................ | 715/209 |
| 2001/0007988 A1 * | 7/2001 | Bauchot et al. | ................ | 707/100 |
| 2003/0110165 A1 | 6/2003 | Selgas et al. | | |
| 2004/0024559 A1 | 2/2004 | Down et al. | | |
| 2004/0253627 A1 * | 12/2004 | Zimmermann et al. | ........... | 435/6 |
| 2006/0173567 A1 * | 8/2006 | Lokowandt | ...................... | 700/99 |
| 2007/0150496 A1 * | 6/2007 | Feinsmith | ...................... | 707/100 |
| 2007/0244850 A1 | 10/2007 | Hoppe et al. | | |
| 2007/0260582 A1 | 11/2007 | Liang | | |

OTHER PUBLICATIONS

Microsoft Access 2000; Samuel T. Scott; 2000.*

(Continued)

*Primary Examiner* — Tony Mahmoudi
*Assistant Examiner* — Mohammad Rahman
(74) *Attorney, Agent, or Firm* — Nicholas Chen; Doug Barker; Micky Minhas

(57) ABSTRACT

Data is commonly stored in multidimensional arrays. Users and computer applications may request or interact with the data objects. As larger amounts of data are stored, the resources used to maintain and manipulate the data increase. An effective way to manage resources is to operate on an index of ranges that identify selected data within a multidimensional array. The index of ranges is associated with only a subset of data objects, instead of the entire multidimensional array. A range may comprise multiple dimensions (e.g. row and column) that are indexed by start and end indexes. Using the index of ranges to access data is efficient because the index of ranges is kept in sorted order, allowing for a binary search for locating and accessing specified data within the multidimensional array. The index of ranges is updated to reflect operations within the multidimensional array, such as, selecting new data or removing data, for example.

20 Claims, 12 Drawing Sheets

(56) References Cited

OTHER PUBLICATIONS

"Xceed DataGrid for WPF Professional Edition", pp. 1-4, http://xceed.com/Grid_WPF_Features.html.

"Xtreme PropertyGrid", Date: Mar. 28, 2008, pp. 1-2, http://www.codejock.com/products/propertygrid.

Abadi Daniel J. "Column•Stores for Wide and Sparse Data", 3rd Biennial Conference on Innovative Data Systems Research (CIDR), Date: Jan. 7-10, 2007, pp. 1-6.

"SourceGrid", Date: Nov. 27, 2007, pp. 1-31, Version: 13, http://www.devage.com/Wiki/ViewArticle.aspx?name=sourcegrid&version=0#SourceGrid_BasicConcepts.

"DatasList vs. DataGrid in ASP.NET", pp. 1-7, http://msdn2.microsoft.com/en-us/magazine/cc301328.aspx.

"Xceed DataGrid for WPF Professional Edition", Available at least as early as Mar. 2008, 4 pages. Available at <<http://xceed.com/Grid_WPF_Features.html>>.

"DatasList vs. DataGrid in ASP.NET", Dec. 2001, 7 pages. Available at <<http://http://msdn2.microsoft.com/en-us/magazine/cc301328.aspx>>.

* cited by examiner

IDENTIFYING OBJECTS WITHIN A MULTIDIMENSIONAL ARRAY

BACKGROUND

Computer systems often represent data as multidimensional data. For example, spreadsheets, tables, data grids, data bases, and other computer structures manage data in multidimensional arrays. Managing data in a multidimensional array often involves storing each object of the multidimensional array. This allows users or computer applications to locate and access the objects within the multidimensional array. An example is a spreadsheet comprising cells. A computer application may search each stored cell to find a specific cell. Another example is when a user or computer application applies various actions to the objects such as rendering the objects, inserting new objects, determine if an object exists within the stored array, or enumerating the objects of the multidimensional array. These actions require locating and accessing the objects. As the amount of multidimensional data increase, the resources needed to store, locate, and perform actions on the data increase. This scenario does not scale well as the number of dimensions increase.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

This disclosure relates to identifying a set of selected objects within a multidimensional array. The set of selected objects may be cells within a spreadsheet having a red background, user selected cells, currently visible cells, or any other designation of a set of selected objects. Users or computer applications many times request objects or perform operations on objects within a multidimensional array. These requests are efficiently performed by managing a sorted index of ranges, representing a subset of the entire multidimensional array data. The index of ranges identifies (e.g. addresses, coordinates, etc.) a set of selected objects within the multidimensional array. One possible format for specifying the index of ranges is to designate a start index and an end index of a dimension (e.g. a row range comprising a start row index and an end row index). This format may be extrapolated to any number of dimensions (e.g. row range comprising a column range).

The index of ranges is maintained in a sorted order, thus allowing a binary search to be performed to efficiently locate and access objects. For example, a computer application may check to see if a specific cell within a spreadsheet is selected (e.g. highlighted). A binary search is performed to determine whether the selected cell is within the index of ranges (the cell is specified). This provides an efficient manner of locating and accessing objects because only a subset of an entire multidimensional array is searched and the index of ranges are sorted allowing for a binary search. The index of ranges is associated with the multidimensional array and is updated depending on operation performed on the array (e.g. selecting new cells, deselecting cells, inserting cells, etc.).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
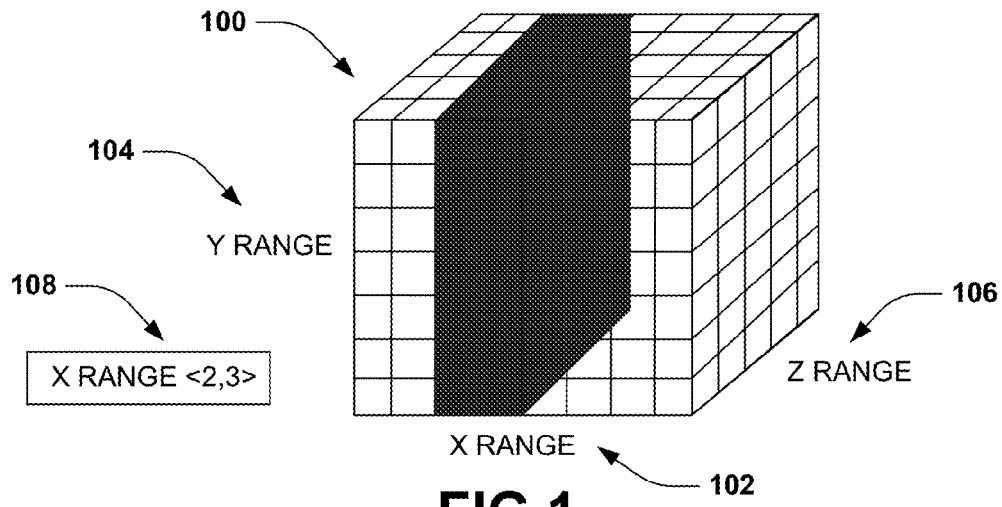
FIG. 1 is an illustration of identifying a multidimensional array by specifying one dimensional range.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Data is often stored and managed within multidimensional arrays (e.g. tables, spreadsheets, arrays, databases, etc.). Multidimensional arrays may comprise of one-dimension, two-dimensions, or any number of dimensions. When the amount of data that is associated within a multidimensional array increases, the resources needed to store the data increase and the time needed to manipulate the data becomes increasingly slower. The performance issues become more significant when data is associated in a greater number of dimensions. For example, performance issues may be acceptable for one-dimensional data (e.g. ListBox), but performance issues increase when scaling to two-dimensional data (e.g. DataGrid).

These performance issues, such as increased memory storage, may occur when every object, including empty cells, within a multidimensional array is maintained. A user or a computer application that interacts (e.g. insert cells, remove cells, select cells, locate cells, enumerate cells, etc.) with objects in a multidimensional array may experience decreased performance because the entire set of objects may be searched to locate and provide access to the objects. For example, when a website renders a table (e.g. a DataGrid), the table may determine what cells a user selected. The table searches the entire collection of cells within the table to determine if a cell is selected. The table is rendered with the selected cells shaded grey. As more cells are associated with the table, the time to render the table is increased because the table searches and interacts with more cells.

Data within a multidimensional array may be represented as a set of objects or cells. One method to mitigate performance issues when interacting with a large amount of multi-dimensional data is to store references (e.g. addresses, indexed rows, indexed columns, etc.) of a subset of selected objects within the multidimensional array. Examples of a subset of selected cells within a spreadsheet are: cells that have the property of a red background; user selected cells; cells currently rendered within the spreadsheet; and cells that comprise a numerical value.

One implementation of a method for storing references to a subset of selected objects within a multidimensional array is a data structure that stores the address of the subset of selected objects in indexed ranges sorted by row and then by column. Performance may increase by keeping the indexed ranges sorted. Objects can be located and accessed using fewer resources because a binary search may be performed on the sorted indexed ranges. A binary search may mitigate the time needed to locate an object by searching first by the row index and then by column index. Performance may also increase because the search comprises the subset of selected objects (not the entire multidimensional array).

The data structure also adds, removes, or modifies indexed ranges to reflect a change of selected objects within the multidimensional array. For example, if a user performs an operation that adds selected objects to the multidimensional array, the data structure updates the indexed ranges to store a set of ranges, in sorted order, corresponding to the new select objects. The data structure may merge overlapping ranges, split ranges, perform intersection operations, or perform compliment operations to the indexed ranges to optimize and maintain a sorted order of the indexed ranges.

An example of a merge operation is a data structure that stores selected objects within in a two-dimensional array (this example may be extrapolated to any number of dimensions) as row ranges and column ranges. The data structure may contain 2 ranges: Row1<start1,end1,column ranges1>and Row2<start2,end2,column ranges2>. The merge is performed when the value of end1 plus 1 is equal to end2, and column ranges1 is equal to column ranges2. The resulting range is Row3<start1,end2,column ranges1>(Row3 replaces Row1 and Row2). The range Row3 is sorted.

Another feature of the data structure is the ability to efficiently query or enumerate the selected objects within the indexed ranges because the indexed ranges are sorted. An example of the data structure enumeration is when selected objects are copied into a clipboard (storage space for copied data). The data structure enumerates the selected objects by column ranges (left to right) and then by row ranges (top to bottom). Because the data structure maintains ranges (e.g. column range, row range, a third dimension range, etc.) in sorted order, the enumeration does not need additional operations, such as, search or sort.

Figure 2:
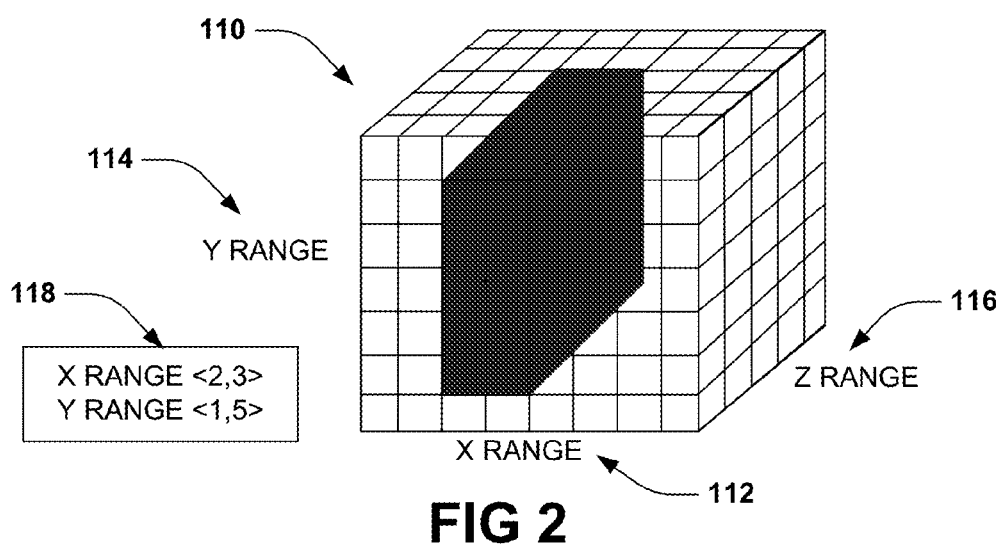
FIG. 2 is an illustration of identifying a multidimensional array by specifying two dimensional ranges.
Figure 3:
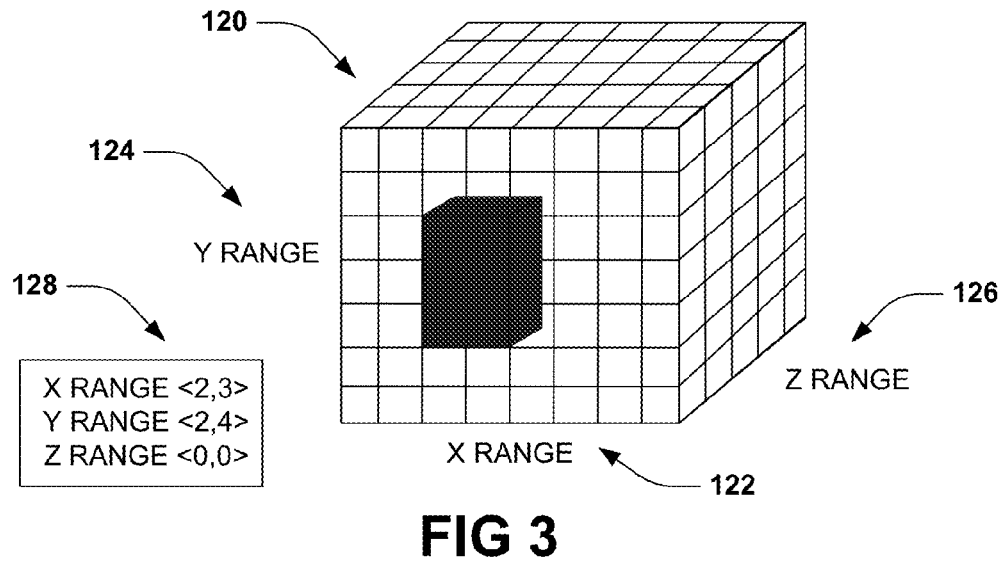
FIG. 3 is an illustration of identifying a multidimensional array by specifying three dimensional ranges.

FIG. 1, FIG. 2, and FIG. 3 illustrate different methods for indexing a three-dimensional array by at least one dimension range. This method can be extrapolated to any set of dimensions. FIG. 1 illustrates a three-dimensional array 100 with an X range 102, Y range 104, and Z range 106. The three-dimensional array 100 is indexed by the X range 108. FIG. 2 illustrates a three-dimensional array 110 with an X range 112, Y range 114, and Z range 116. The three-dimensional array 110 is indexed by the X range and Y range 118. FIG. 3 illustrates a three-dimensional array 120 with an X range 122, Y range 124, and Z range 126. The three-dimensional array 120 is indexed by the X range, Y range, and Z range 128.

Figure 4:
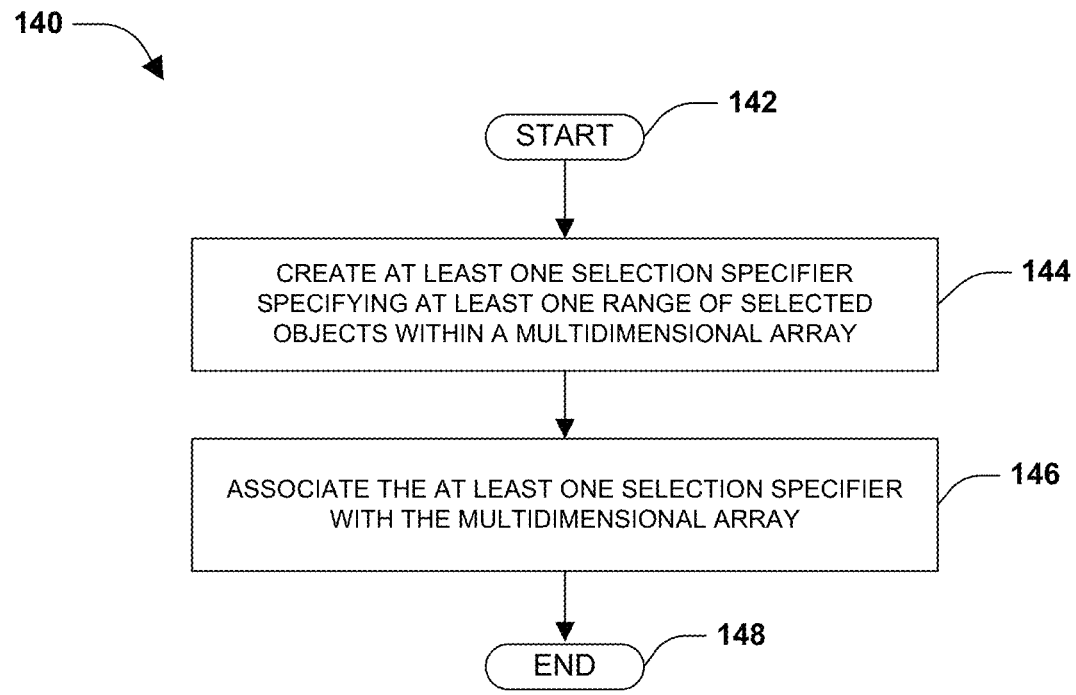
FIG. 4 is a flow diagram illustrating an exemplary method for identifying a set of selected objects in a multidimensional array.

One embodiment of identifying a set of selected objects in a multidimensional array is illustrated by an exemplary method 140 in FIG. 4. At 142 the method begins. At 144, at least one selection specifier, specifying at least one range of selected objects within the multidimensional array, is created. The range of selected objects may comprise at least one dimensional interval (e.g. row, column, axis, etc.) with a start index and an end index of the dimension. An example of specifying at least one range of selected objects within a two-dimensional array is a selection specifier comprising a first dimension range object (row range). The first dimension range object comprises a first dimension start index (row start index), a first dimension end index (row end index), and at least one second dimension range object (column range). The second dimension range object may comprise a second dimension start index (column start index) and a second dimension end index (column end index). An example format for the range is Row(start index, end index, <Col(start index, end index)>). At, 146 the at least one selection specifier is associated with the multidimensional array. The selection specifier may be associated with the multidimensional array by responding to operations (insert cells, remove cells, render cells, enumerate cells, etc.) within the multidimensional array. The selection specifier may add, remove, merge, split, update, or sort the range of selected objects to correspond a set of selected objects (after the operation changes the set of selected objects) within the multidimensional array. The method ends at 148.

Figure 5:
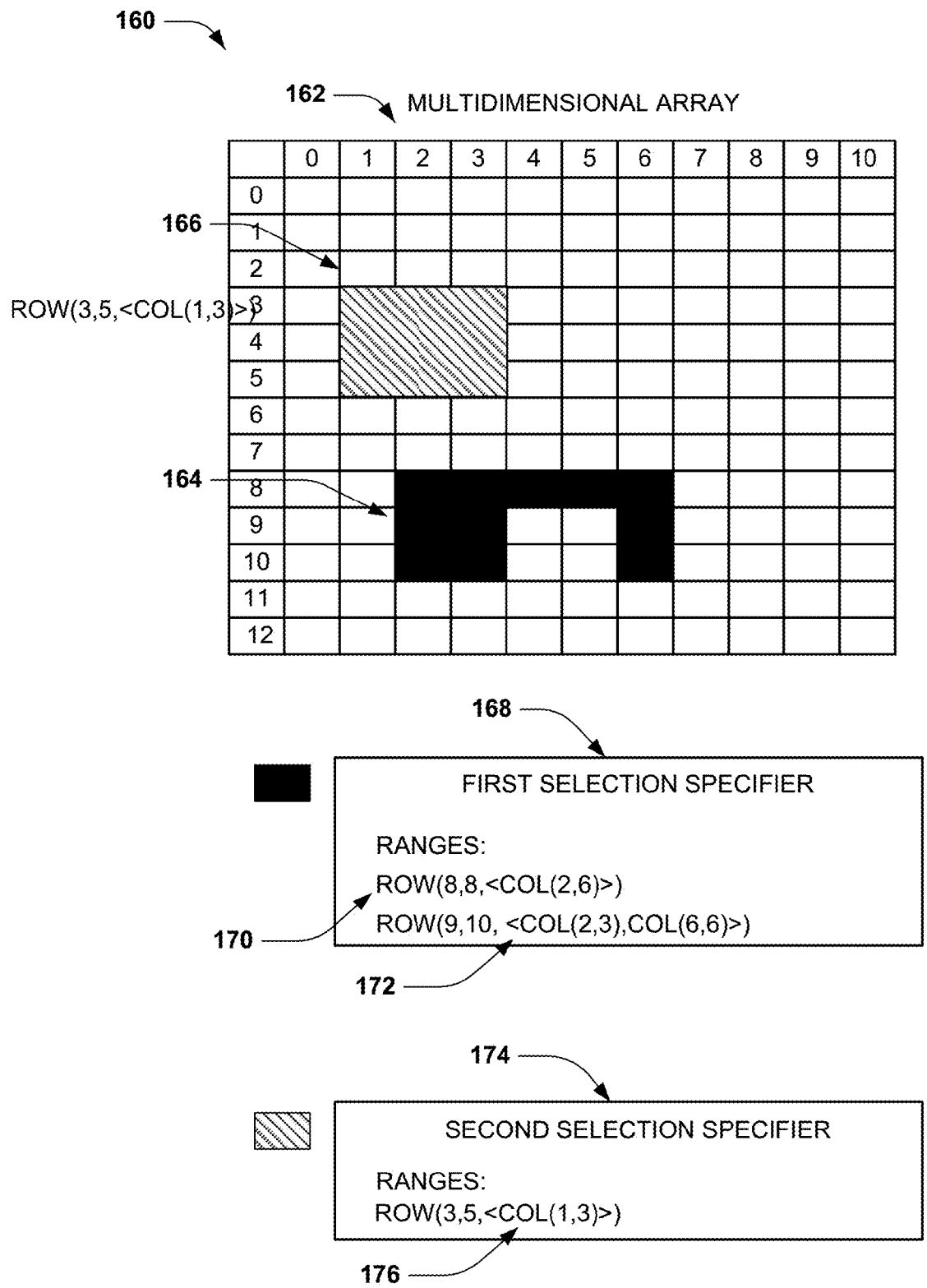
FIG. 5 is an illustration of a system configured to identify a first set of selected objects and a second set of selected objects within a multidimensional array.

FIG. 5 illustrates an example of a system 160 configured to indentify a first set of selected objects 164 and a second set of selected objects 166 within a multidimensional array 162. The multidimensional array 162 is two-dimensional, but can be extrapolated to any set of dimensions (such as illustrated in the three-dimensional illustration of FIG. 1-3). Both sets of selected objects may be defined as user selected objects, objects associated together (e.g. red cells, rendered cells, cells containing formulas), or any other method of defining a set of selected objects.

A first selection specifier 168 comprises a first black cells range 170 and a second black cells range 172. The first black cells range 170 and the second black cells range 172 identifies the set of selected black cells (selected objects) 164. The first black cells range 170 indentifies the black cells starting at row 8 and ending at row 8, which start at column 2 and end at column 6 (start row index of 8, end row index of 9, start column index of 2, and end column index of 6). The second black cells range 172 identifies the black cells starting at row 9 and ending at row 10, which start at column 2 and end at column 3 The second black cells range 172 also identifies black cells starting at row 9 and ending at row 10, which start at column 6 and end at column 6. The second black cells range 171 comprises a start row index of 9, and end row index of 10, a start column index of 2, and end column index of 3, a second start column index of 6, and a second end column index of 6.

A second selection specifier 174 comprises a stripped cells range 176. The stripped cells range 176 identifies the set of stripped cells (selected objects) 166. The stripped cells range 176 indentifies the stripped cells starting at row 3 and ending at row 5, which start at column 1 and end at column 3 (start row index of 3, end row index of 3, start column index of 1, and end column index of 3). The first selection specifier 168 and the second selection specifier 174 maintain the ranges in sorted order by a sort criterion (e.g. ascending order by starting row index, then within each row, ascending order by start column index).

Figure 6:
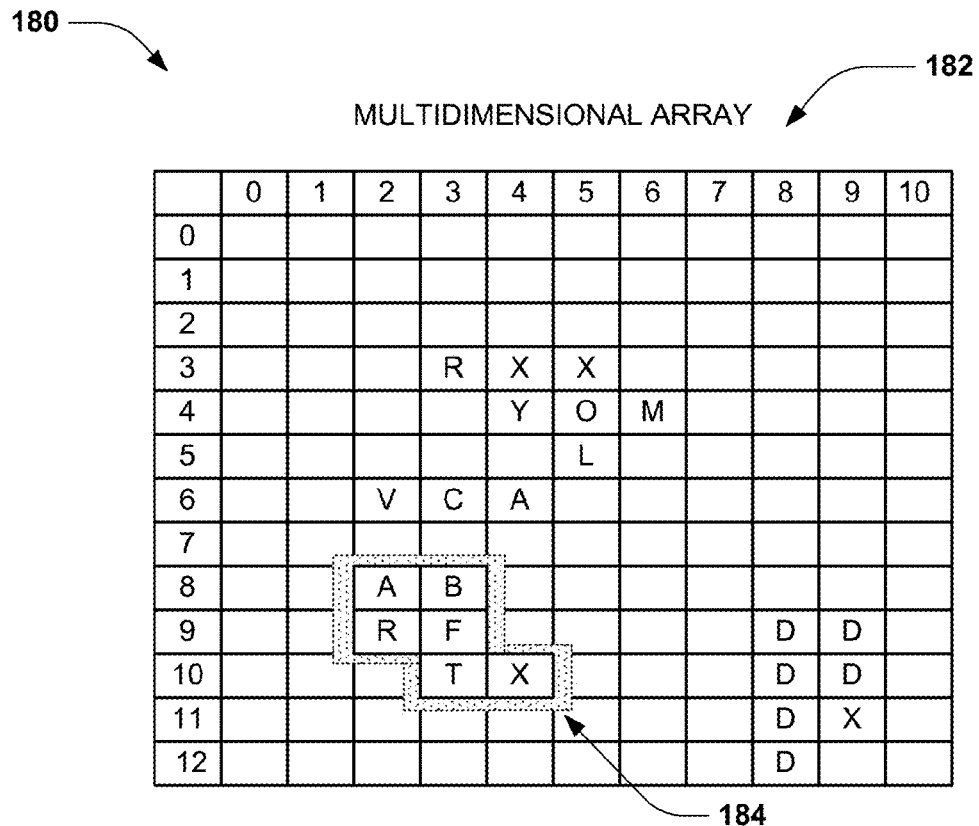
FIG. 6 is an illustration of a system configured to identify within a multidimensional array a set of selected objects.
Figure 6:
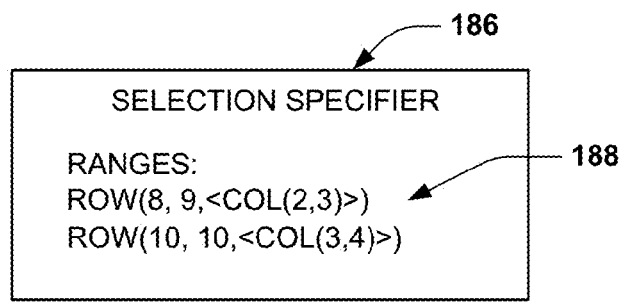

FIG. 6 illustrates an example of a system 180 configured to identify a set of selected objects 184 within a multidimensional array 182. The multidimensional array 182 is two-dimensional, but can be extrapolated to any set of dimensions (such as illustrated in the three-dimensional illustration of FIG. 1-3). The set of selected objects 184 comprises the characters: A, B, R, F, T, X. A selection specifier 186 indentifies the set of selected objects 184 by specifying two ranges 188, Row(8,9,<Col(2,3)>) and Row(10,10,<Col(3,4)>). The two ranges 188 are sorted by ascending order of start row index, then within each row, ascending order of start column index. The two ranges 188 indentify the address of each object (characters) within the set of selected objects 184. Locating or performing operations on objects within the set of selected objects 184 are efficiently accomplished through a binary search. The binary search searches within the two ranges 188, instead of searching the entire multidimensional array 182.

Figure 7:
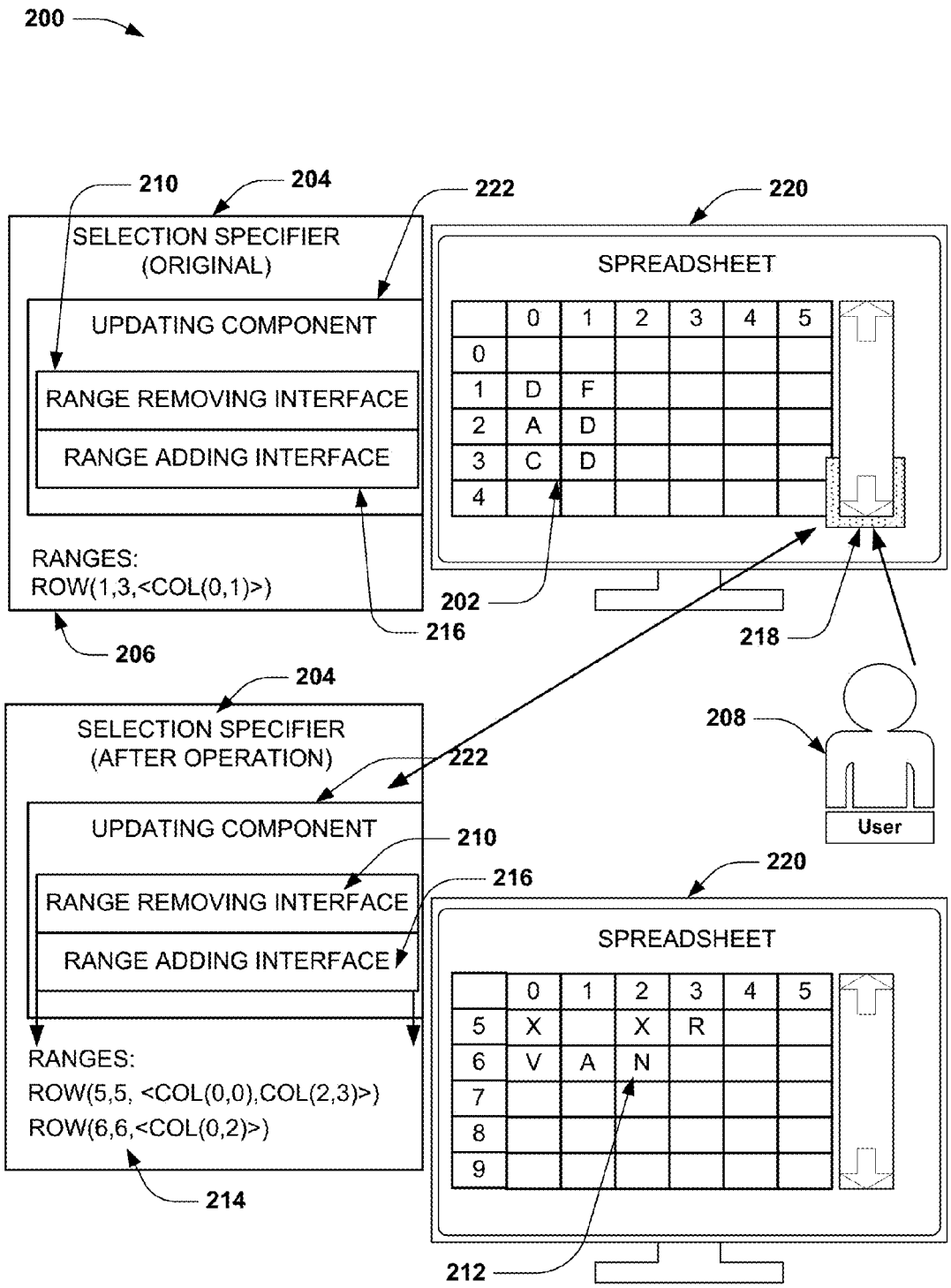
FIG. 7 is an illustration of a system configured to identify within a spreadsheet a set of selected cells before a scroll operation, and a set of new selected cells after the scroll operation.

FIG. 7 illustrates an example of a system 200 configured to indentify within a spreadsheet 220 an original set of selected cells 202 before a user 208 performs a scroll operation 218, and identify a set of new selected cells 212 after the scroll operation 218. The spreadsheet 220 is two-dimensional, but can be extrapolated to any set of dimensions (such as illustrated in the three-dimensional illustration of FIG. 1-3).

A selection specifier 204 (original) specifies an original range 206 of the original set of selected cells 202 within the spreadsheet 220. The original range 206 comprises references (e.g. addresses) indexed by row and column to the original set of selected cells 202. The selection specifier 204 comprises an updating component 222 configured to detect operations (e.g. scrolling, inserting cells, removing cells, rendering cells, etc.) within the spreadsheet 220. An updating component may be configured to receive an operation; identify a set of new selected objects within a multidimensional array; and update a selection specifier with at least one range of the set of new selected objects. The updating component 222 comprises a range removing interface 210 and a range adding interface 216. A range removing interface removes ranges from a selection specifier when objects are deselected (removed) from a multidimensional array. A range adding interface adds ranges to a selection specifier when new objects are selected (inserted) within a multidimensional array.

In the example of system 200, the updating component 222 detects and receives the scrolling operation 218 within the spreadsheet 220 by the user 208. The updating component detects that the set of new selected cells 212 is selected. The updating component 222 updates the selection specifier 204 (after operation) by means of the range removing interface 210 and the range adding interface 216. The original set selected cells 202 are not rendered within the spreadsheet 220 (therefore are deselected within the spreadsheet) after the scrolling operation 218 occurs. The range removing interface 210 removes from the selection specifier 204 the original set of selected cells 202. The range adding interface 216 adds the set of new ranges 214 (corresponding to the set of new selected cells) into the selection specifier 204. The set of new selected cells 212 are rendered (selected) within the spreadsheet 220 after the scrolling operation 218 occurs. The selection specifier 204 (after operation) now comprises a set of new ranges 214 that indentify the set of new selected cells 212 within the spreadsheet 220.

Figure 8:
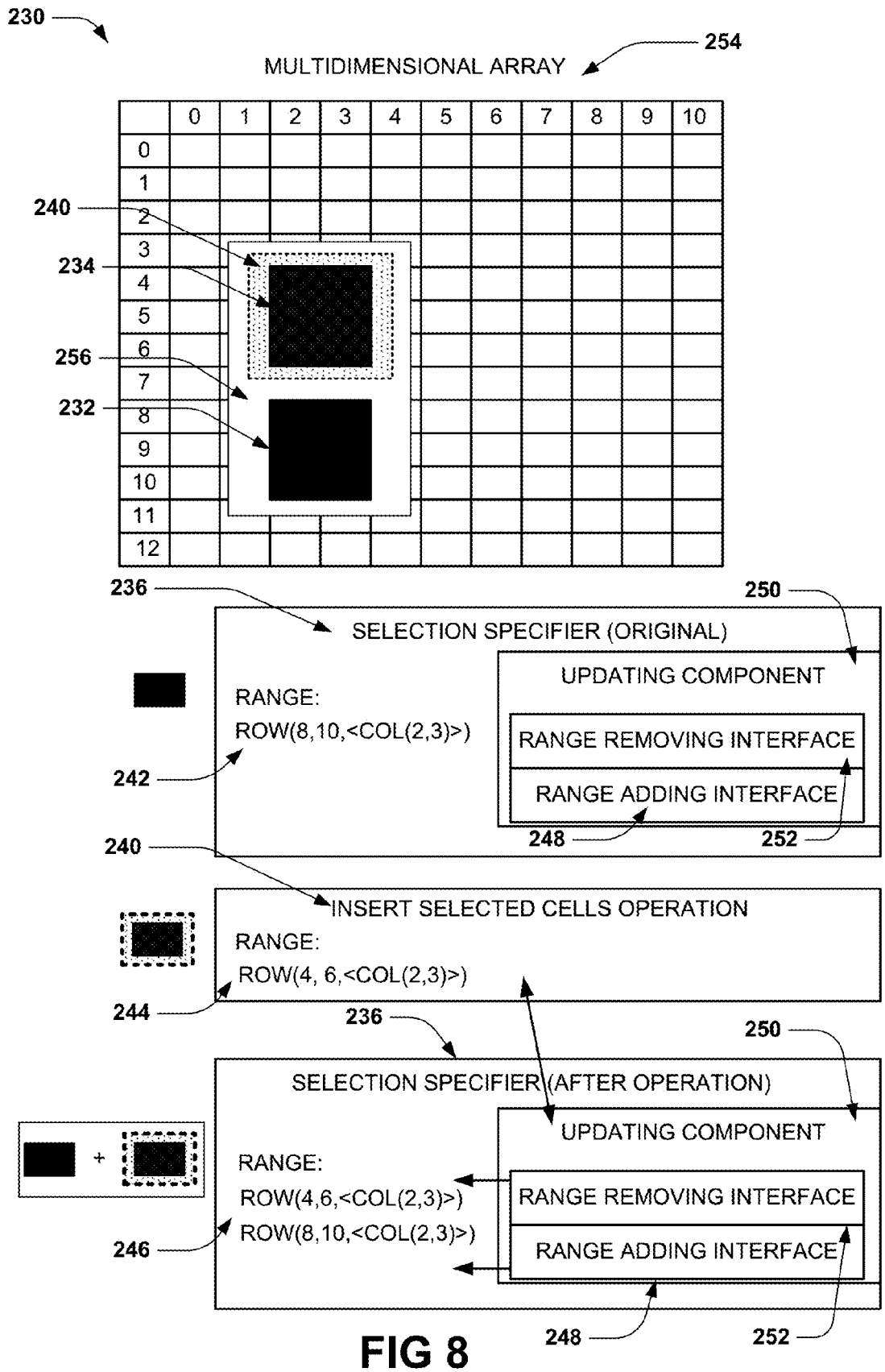
FIG. 8 is an illustration of a system configured to identify within a multidimensional array a set of selected objects before an insertion operation of selected cells, and a set of new selected cells after the insertion operation.

FIG. 8 illustrates an example of a system 230 configured to identify within a multidimensional array 254 an original set of selected cells 232 before an insertion operation 240 of a set of operated on cells 234, and a set of new selected cells 256 after the insertion operation 240. The multidimensional array 254 is two-dimensional, but can be extrapolated to any set of dimensions (such as illustrated in the three-dimensional illustration of FIG. 1-3).

A selection specifier 236 (original) specifies an original range 242 of the original set of selected cells 232 within the multidimensional array 254. The original range 242 comprises references (e.g. addresses) indexed by row and column to the original set of selected cells 232. The selection specifier 236 comprises an updating component 250 configured to receive an operation; identify a set of new selected objects within a multidimensional array; and update a selection specifier with at least one range of the set of new selected objects. The updating component 250 comprises a range removing interface 252 and a range adding interface 248. A range removing interface removes ranges from a selection specifier when objects are deselected (removed) from a multidimensional array. A range adding interface adds ranges to a selection specifier when new objects are selected (inserted) within a multidimensional array.

In the example of system 230, the updating component 250 detects and receives an insert selected cells operation 240. The updating component 250 identifies that a set of operated on cells 234 has been inserted into the multidimensional array 254. The set of operated on cells 234 has an operated on cell range 244. The updating component 250 updates the selection specifier 236 (after operation) by means of the range adding interface 248. The range adding interface 248 receives the operated on cell range 244 and adds the operated on cell range 244 to the selection specifier 236 (after operation). The selection specifier 236 (after operation) now comprises a set of new ranges 246 that identifies the set of new selected cells 256 within the multidimensional array 254.

Figure 9:
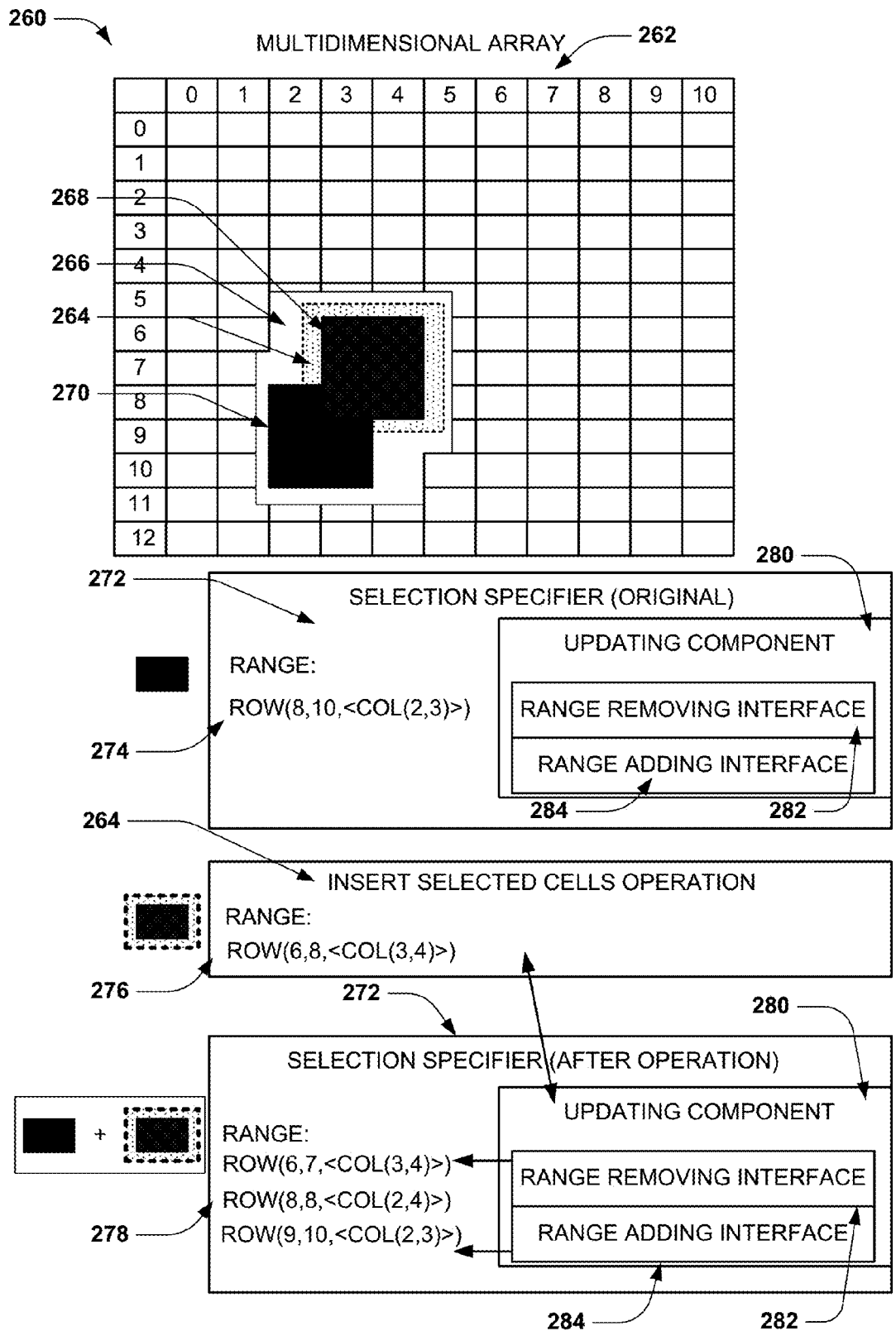
FIG. 9 is an illustration of a system configured to identify within a multidimensional array a set of selected objects before an insertion operation of overlapping selected cells, and a set of new selected cells after the insertion.

FIG. 9 illustrates an example of a system 260 configured to identify within a multidimensional array 262 an original set of selected cells 270 before an insertion operation 264 (with overlap) of a set of operated on cells 268, and a set of new selected cells 266 after the insertion operation 264. The multidimensional array 262 is two-dimensional, but can be extrapolated to any set of dimensions (such as illustrated in the three-dimensional illustration of FIG. 1-3).

A selection specifier 272 (original) specifies an original range 274 of the original set of selected cells 270 within the multidimensional array 262. The selection specifier 272 comprises an updating component 280 configured to receive an operation; identify a set of new selected objects within a multidimensional array; and update a selection specifier with at least one range of the set of new selected objects. The updating component 280 comprises a range removing interface 282 and a range adding interface 284. A range removing interface removes ranges from a selection specifier when objects are deselected (removed) from a multidimensional array. A range adding interface adds ranges to a selection specifier when new objects are selected (inserted) within a multidimensional array.

In the example of system 260, the updating component 280 detects and receives an insert selected cells operation 264. The updating component 280 identifies that the set of operated on cells 268 has been inserted (selected) into the multidimensional array 262. The set of operated on cells 268 has an operated on cell range 276. The operated on cell range 276 overlaps the original range 274 of the original set of selected cells 270. The range adding interface 282 merges the appropriate ranges of the original range 274 with the operated on cell range 276 (there is an overlap of row 8 column 3 that creates a Row(8,8,<Col(2,4)>), so that a set of new ranges 278 remains in sorted order. The range removing interface 284 splits the appropriate ranges of the original range 274 and the operated on cell range 276 (row 6 and row 7 now have separate column designations than row 10 and 11, therefore two subselection ranges are created: Row(6,7<Col(3,4)>) and Row(9,10,<Col(2,3)>)). The selection specifier 272 (after operation) now comprises the set of new ranges 278, in sorted order, that identifies the set of new selected cells 266 within the multidimensional array 262.

Figure 10:
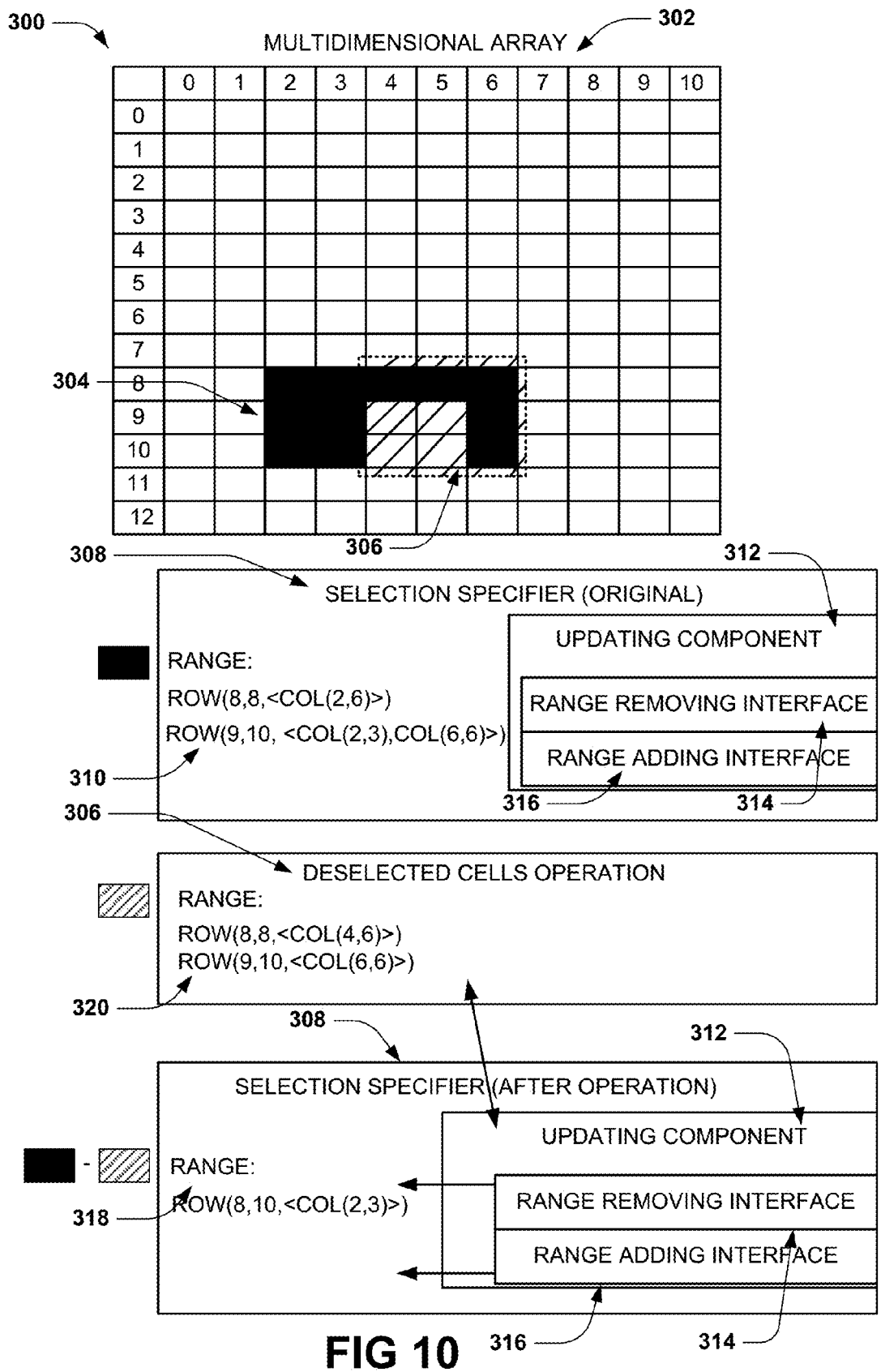
FIG. 10 is an illustration of a system configured to identify within a multidimensional array a set of selected objects before a deselection operation, and a set of new selected cells after the deselection operation.

FIG. 10 illustrates an example of a system 300 configured to identify within a multidimensional array 302 an original set of selected cells before a deselection operation 306 (e.g. removing cells), and a set of new selected cells 304 after the deselection operation 306. The multidimensional array 302 is two-dimensional, but can be extrapolated to any set of dimensions (such as illustrated in the three-dimensional illustration of FIG. 1-3).

A selection specifier 308 (original) specifies an original range 310 of selected cells within the multidimensional array 302. The selection specifier 308 comprises an updating component 312. The updating component 312 comprises a range removing interface 314 and a range adding interface 316.

In the example of system 300, the updating component 312 detects and receives a deselected cells operation 306 (e.g. removing cells from the multidimensional array). The updating component 312 identifies an operated on cell range 320 of the deselected cells. The range removing interface 314 receives the operated on cell range 320 of the deselected cells and removes the corresponding operated on cell range 320 from the selection specifier 308. The updating component 312 may merge ranges, split ranges, perform intersect operations, and/or perform compliment operations to maintain a set of new ranges 318 in sorted order. The selection specifier 308 (after operation) now comprises the set of new ranges 318 that identifies the set of new selected cells 304 within the multidimensional array 302.

Figure 11:
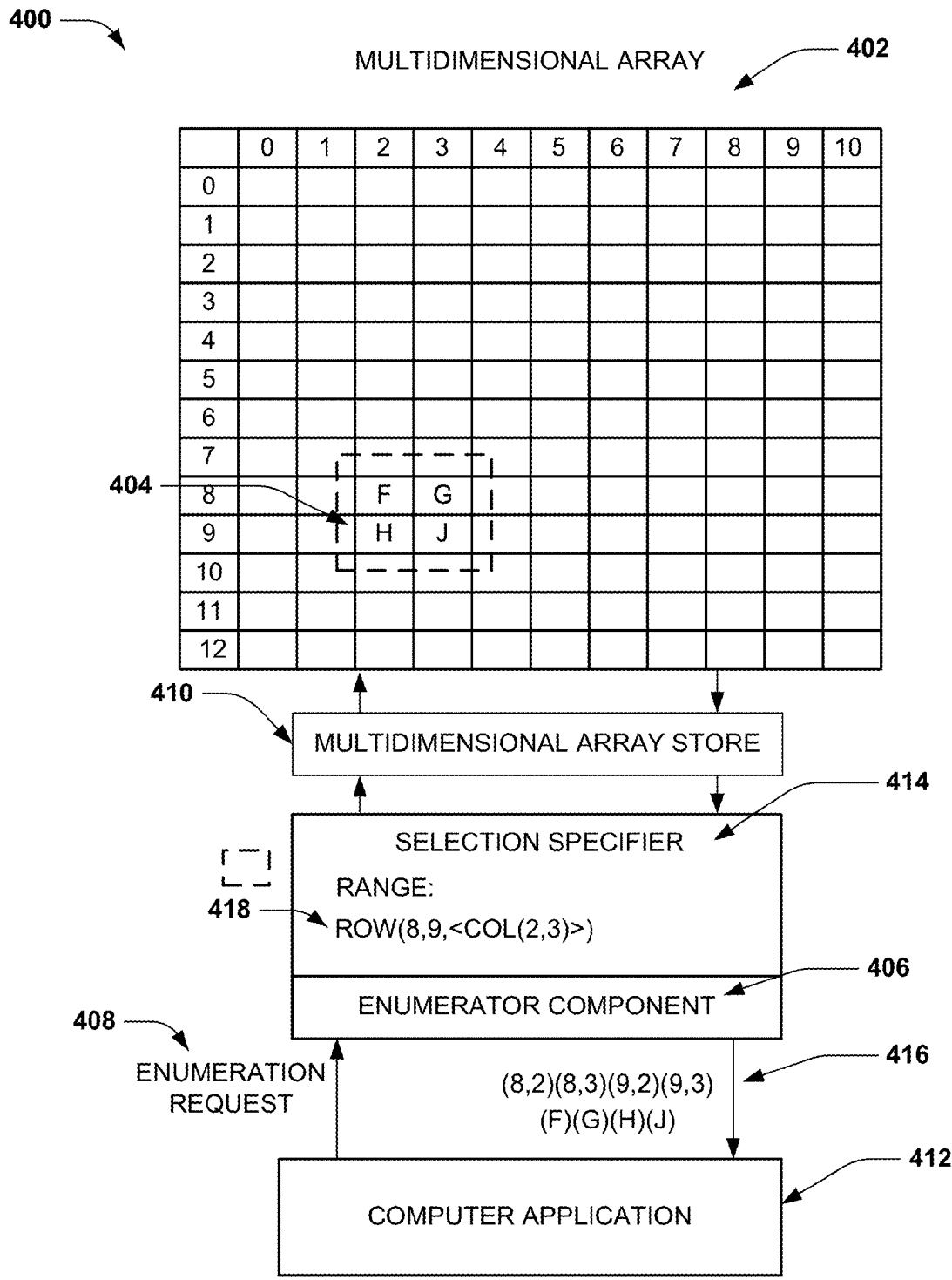
FIG. 11 is an illustration of a system configured to identify within a multidimensional array a set of selected cells and enumerate the set of selected cells.

FIG. 11 illustrates an example of a system 400 configured to identify within a multidimensional array 402 a set of selected cells 404. The system 400 is configured to enumerate the set of selected cells 404. The multidimensional array 402 is two-dimensional, but can be extrapolated to any set of dimensions (such as illustrated in the three-dimensional illustration of FIG. 1-3).

A multidimensional array store 410 (e.g. a data structure, memory addresses, array of cells, collection of cells, etc.) stores objects comprised within each cell of the multidimensional array 402. A selection specifier 414 specifies a range 418 of selected cells 404 within the multidimensional array 402. The selection specifier 414 comprises an enumerator component 406 configured to receive an enumeration request 408 and produce an enumeration 416 over the range 418 of the set of selected cells 404. The enumeration 416 may return the address of each cell within the range 418. The enumeration 416 may also return the object of each cell within the range 418.

In the example of system 400, the enumerator component 406 detects and receives an enumeration request 408. The enumerator component 406 retrieves the objects (F,G,H,J) contained within the range 418 (addresses (8,2)(8,3)(9,2)(9,3)) from the multidimensional array store 410. The enumerator component 406 returns an enumeration 416 of the objects and addresses of the selected cells 404 in sorted order by row then column.

Figure 12:
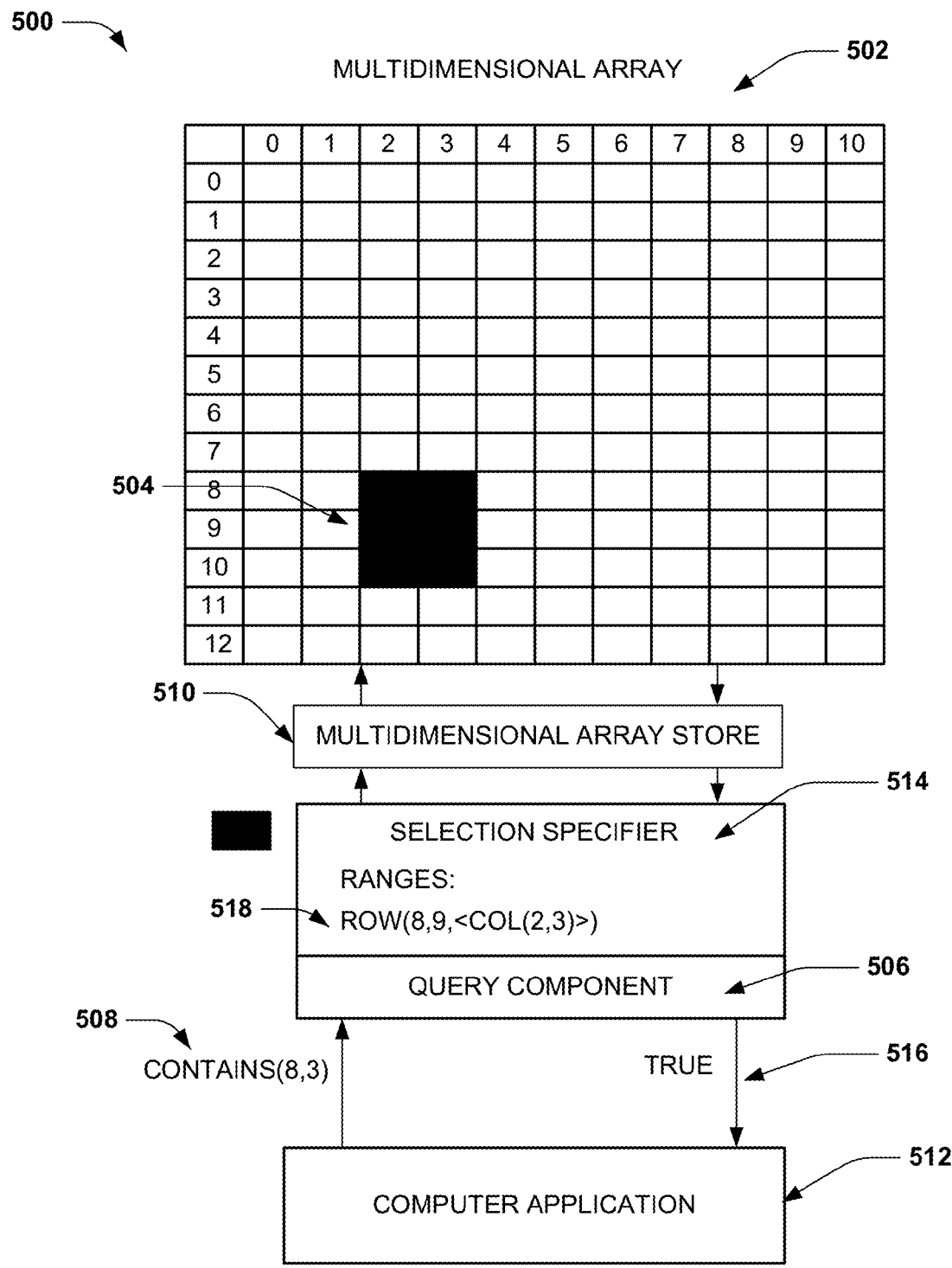
FIG. 12 is an illustration of a system configured to identify within a multidimensional array a set of selected cells and query the set of selected cells to determine if a cell is comprised within the set of selected cells.
Figure 13:
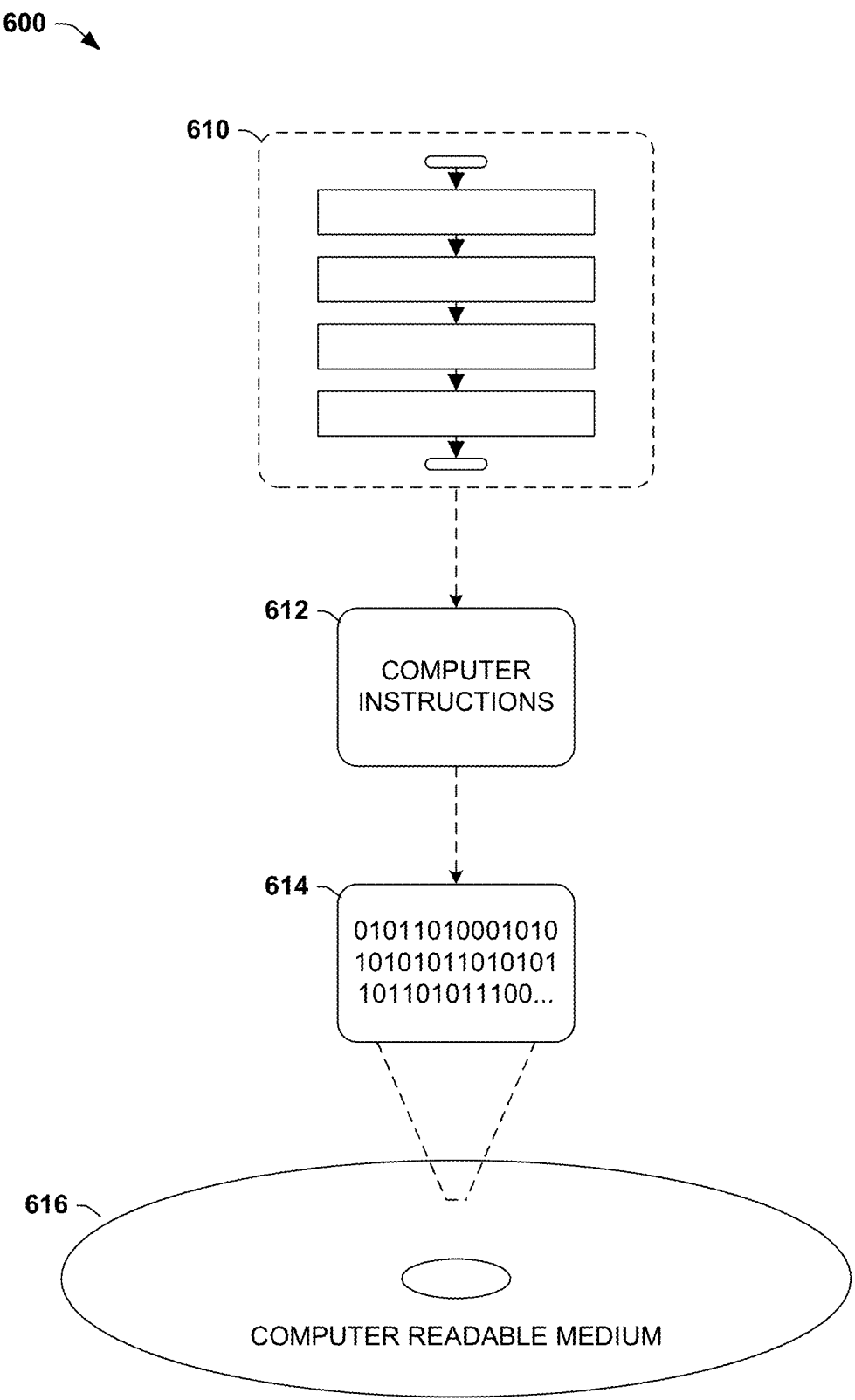
FIG. 13 is an illustration of an exemplary computer-readable medium comprising processor-executable instructions configured to embody one or more of the provisions set forth herein.

FIG. 12 illustrates an example of a system 500 configured to identify within a multidimensional array 502 a set of selected cells 504. The system 500 is configured to query the set of selected cells 504 to determine if a cell is contained within the set of selected cells 504. The multidimensional array 502 is two-dimensional, but can be extrapolated to any set of dimensions (such as illustrated in the three-dimensional illustration of FIG. 1-3).

A multidimensional array store 510 (e.g. a data structure, memory addresses, array of cells, collection of cells, etc.) stores objects comprised within each cell of the multidimensional array 502. A selection specifier 514 specifies a range 518 of selected cells 504 within the multidimensional array 502. The selection specifier 514 comprises a query component 506 configured to receive a query request 508 (e.g. contains(x,y)) and determine whether the query cell (8,3) is contained within the range 518 of selected cells 504. The query component 506 may return a value or any other identification (e.g. Boolean value) indicating if the query cell is contained within the range 518 of selected cells 504.

In the example of system 500, the query component 506 detects and receives a query request 508 from a computer application 512. The query component 506 determines whether the cell address (8,3) is contained within the range 518 of selected cells 504. The query component 506 determines (8,3) is within the range 518 and returns True 516 to the computer application 512. One method the selection specifier can perform to make the query determination is by performing a binary search for 8 (x coordinate) by row ranges within the range 518. If 8 (x coordinate) is found within the row ranges, then the selection specifier performs a binary search for 3 (y coordinate) by column ranges within the range 518. This method illustrates a two-dimensional query determination, but can be extrapolated to any set of dimensions (such as illustrated in the three-dimensional illustration of FIG. 1-3).

Still another embodiment involves a computer-readable medium comprising processor-executable instructions configured to implement one or more of the techniques presented herein. An exemplary computer-readable medium that may be devised in these ways is illustrated in FIG. 12, wherein the implementation 600 comprises a computer-readable medium 616 (e.g., a CD-R, DVD-R, or a platter of a hard disk drive), on which is encoded computer-readable data 610. This computer-readable data 610 in turn comprises a set of computer instructions 612 configured to operate according to one or more of the principles set forth herein. In one such embodiment 600, the processor-executable instructions 614 may be configured to perform a method, such as the exemplary method 140 of FIG. 4, for example. In another such embodiment, the processor-executable instructions 614 may be configured to implement a system, such as the exemplary system 160 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 14:
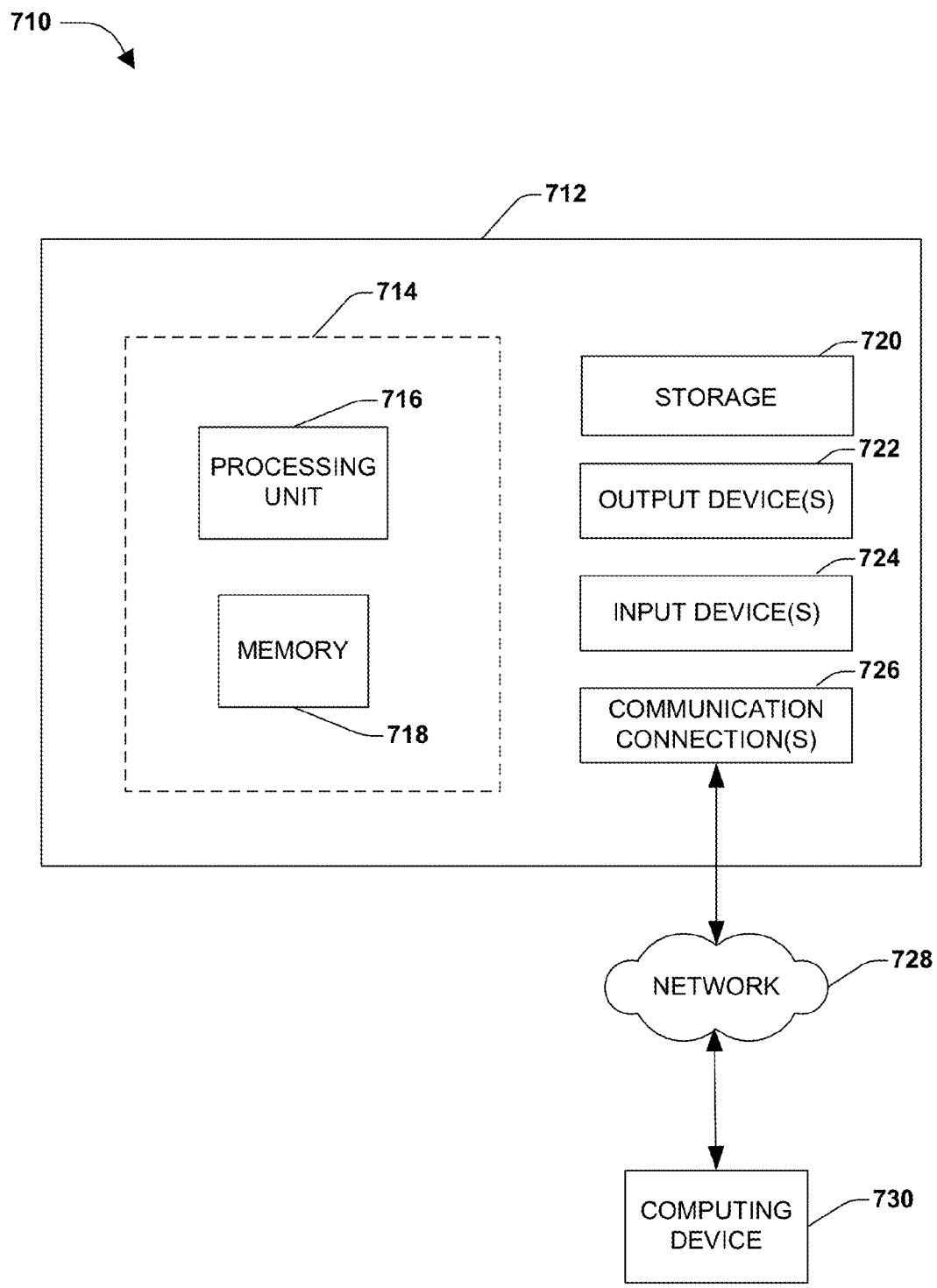
FIG. 14 illustrates an exemplary computing environment wherein one or more of the provisions set forth herein may be implemented.

FIG. 14 and the following discussion provide a brief, general description of a suitable computing environment to implement embodiments of one or more of the provisions set forth herein. The operating environment of FIG. 14 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 14 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 14 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 14 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
   receiving a selection of objects within a multidimensional array;
   creating a first selection specifier specifying a plurality of addresses of the selected objects based upon the receiving, the plurality of addresses of the selected objects stored in a sorted order within the first selection specifier according to a row sort criteria of row addresses and then according to a column sort criteria of column addresses, the row sort criteria corresponding to a numerical ordering of a row start address of a first row in relation to a row start address of a second row and the column sort criteria corresponding to a numerical ordering of a column start address of a first column in relation to a column start address of a second column; and
   updating the first selection specifier to at least one of:
     specify a first address of a first object based upon a selection of the first object; or
     not specify a second address, comprised in the plurality of addresses, of a second object based upon a deselection of the second object.

2. The method of claim 1:
   the multidimensional array comprising a multidimensional spreadsheet, and the selected objects comprising selected cells in the multidimensional spreadsheet.

3. The method of claim 1, the first selection specifier comprising at least two addresses.

4. The method of claim 1, comprising:
   responsive to receiving a selected object query specifying a designated object, executing a binary search algorithm upon the plurality of addresses stored in the sorted order to identify whether the designated object is within the selected objects.

5. The method of claim 1, comprising:
   creating a second selection specifier corresponding to a second set of selected objects within the multidimensional array.

6. The method of claim 1, the selected objects corresponding to a first set of adjacent cells and a second set of adjacent cells within the multidimensional array, the first set of adjacent cells not adjacent to the second set of adjacent cells.

7. The method of claim 5, the selected objects having a first feature and objects of the second set of selected objects having a second feature different than the first feature.

8. The method of claim 1, the multidimensional array comprising a multidimensional spreadsheet.

9. The method of claim 1, comprising:
   enumerating the selected objects specified by the plurality of addresses.

10. The method of claim 1, the second object comprised in the selected objects prior to the deselection.

11. The method of claim 1,
    the first selection specifier specifying at least two addresses,
    the method comprising:
    merging the at least two addresses into a merged address; and
    replacing the at least two addresses with the merged address in the first selection specifier.

12. The method of claim 1, comprising:
    splitting a third address, comprised in the plurality of addresses, into two subselection addresses; and
    replacing the second address with the two subselection addresses in the first selection specifier.

13. A system, implemented at least in part via a processing unit, comprising:

a selection specifier component configured to:
   receive a selection of objects within a multidimensional array; and
   create a first selection specifier specifying a plurality of addresses of the selected objects based upon the receiving, the plurality of addresses of the selected objects stored in a sorted order within the first selection specifier according to a row sort criteria of row addresses and then according to a column sort criteria of column addresses, the row sort criteria corresponding to a numerical ordering of a row start address of a first row in relation to a row start address of a second row and the column sort criteria corresponding to a numerical ordering of a column start address of a first column in relation to a column start address of a second column.

14. The system of claim 13, comprising:
an updating component configured to update the first selection specifier to specify a first address of a first object based upon a selection of the first object.

15. The system of claim 13, comprising:
an updating component configured to update the first selection specifier to not specify a second address, comprised in the plurality of addresses, of a second object based upon a deselection of the second object.

16. The system of claim 13, the selection specifier component configured to:
identify the selected objects based upon the selected objects having a feature that is not associated with unselected objects within the multidimensional array.

17. The system of claim 13, the selection specifier component comprising:
a query component configured to:
   responsive to receiving a selected object query specifying a designated object, execute a binary search algorithm upon the plurality of addresses stored in the sorted order to identify whether the designated object is within the selected objects.

18. The system of claim 13, the selection specifier component comprising:
an enumerator component configured to enumerate the selected objects specified by the plurality of addresses.

19. The system of claim 13, the multidimensional array comprising a multidimensional spreadsheet.

20. A computer storage device comprising computer executable instructions that when executed via a processing unit perform a method comprising:
creating a first selection specifier specifying a plurality of addresses of selected objects within a multidimensional array, the plurality of addresses of the selected objects stored in a sorted order within the first selection specifier according to a row sort criteria of row addresses and then according to a column sort criteria of column addresses, the row sort criteria corresponding to a numerical ordering of a row start address of a first row in relation to a row start address of a second row and the column sort criteria corresponding to a numerical ordering of a column start address of a first column in relation to a column start address of a second column.

\* \* \* \* \*